United States Patent

[11] 3,593,751

[72] Inventors Donald L. Herling
 Mundelein;
 Frank A. Larson, Lombard; George F. Kovar, Berwyn, all of, Ill.
[21] Appl. No. 832,238
[22] Filed June 11, 1969
[45] Patented July 20, 1971

[54] FLEXIBLE ELECTRICAL TRANSMISSION MEMBER
 6 Claims, 4 Drawing Figs.
[52] U.S. Cl.................................................. 138/121,
 333/95
[51] Int. Cl.................................................F16l 11/00,
 H01p 3/12
[50] Field of Search........................................ 138/109,
 143, 139, 121, 120, 118, 109; 333/95, 95 A

[56] References Cited
 UNITED STATES PATENTS
1,475,289 11/1923 Diescher........................ 138/118 X

| | | | |
|---|---|---|---|
| 1,505,121 | 8/1924 | Allport........................ | 138/121 X |
| 2,600,169 | 6/1952 | Lamb........................... | 138/121 X |
| 2,657,364 | 10/1953 | Carr............................. | 138/121 X |
| 2,675,832 | 4/1954 | Hamilton..................... | 138/121 X |
| 2,696,834 | 12/1954 | Carr............................. | 138/121 X |
| 2,758,612 | 8/1956 | Zaleski........................ | 138/121 X |
| 3,307,589 | 3/1967 | Sheffield..................... | 138/109 |
| 3,479,621 | 11/1969 | Martin......................... | 138/143 X |

Primary Examiner—Henry K. Artis
Attorney—Hofgren, Wegner, Allen, Stellman & McCord ABSTRACT: A flexible bellowslike electrical transmission member having rigid end sections is vibration damped by a jacket of resilient elastic material deposited on the bellows. The elastic jacket completely surrounds the ends of the bellows and has narrow strips extending along the middle of the bellows. The flexible bellows are joined to each rigid end section by a rigid face-to-face connection between a fin of the bellows and a surface of the rigid end section.

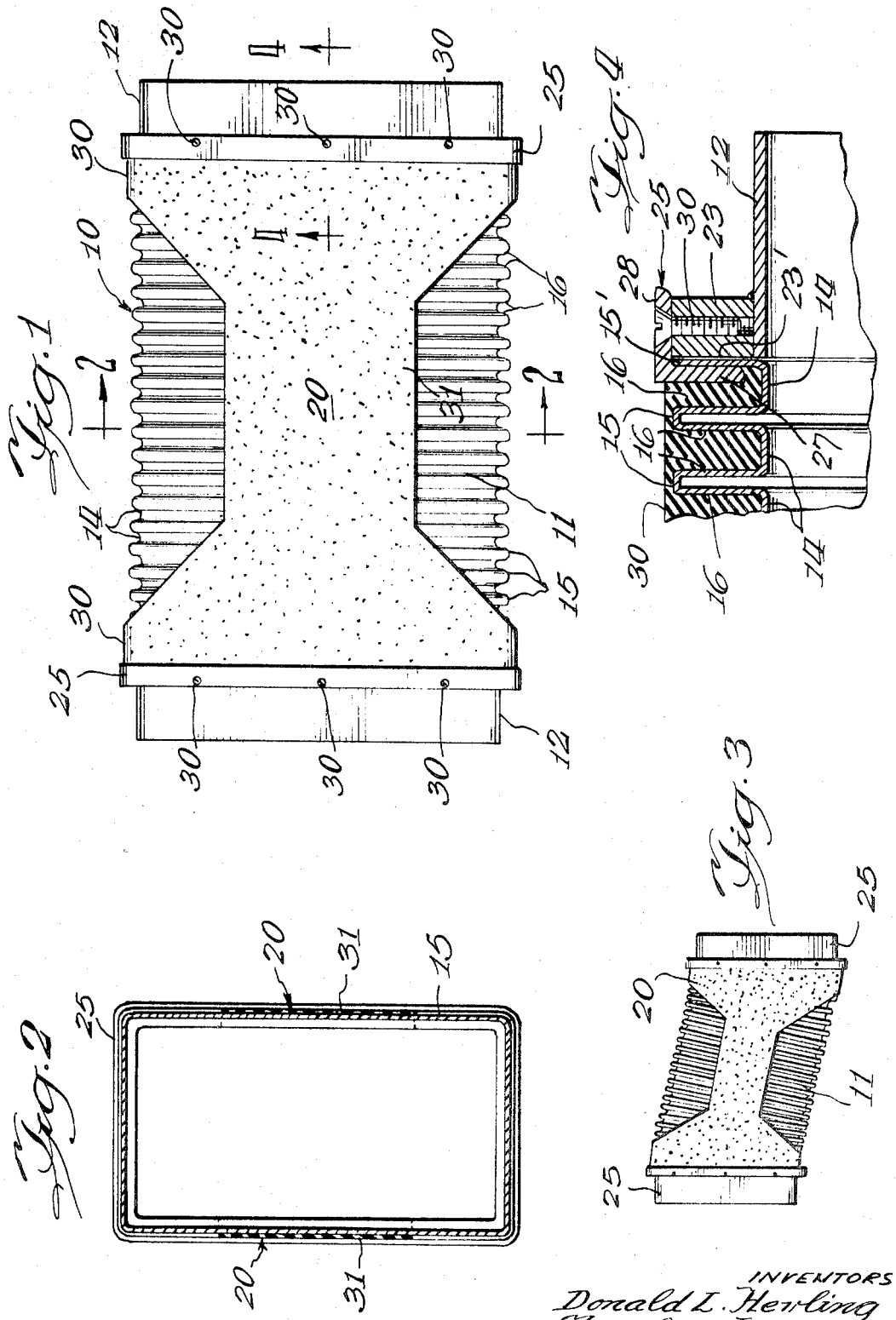

FLEXIBLE ELECTRICAL TRANSMISSION MEMBER

This invention relates to a flexible electrical transmission member.

To interconnect rigid electrical transmission members which are not axially aligned, a flexible electrical transmission member is used which maintains the electrical transmission characteristics of the rigid members and allows misalignment and relative motion or vibration between the rigid members. Such flexible member is usually of bellowslike construction, formed by a plurality of sections having integral fins. The flexible member may for example, be in the form of a wave guide or coaxial transmission line.

Such flexible electrical transmission members have heretofore been subject to undesirable vibration and flexing due to inadequate damping caused by the metallic construction of the bellows. Vibrations occurring at the joint between the flexible member and a rigid member cause undesirable fatigue and eventual failure. In addition, the center part of flexible bellows tends to bow when the section is under pressure.

In accordance with the present invention, a resilient elastic jacket is molded to the flexible electrical transmission member to eliminate these problems. The jacket encircles the bellows at the joint where the bellows joins a rigid end member, damping vibrations at the joint and reducing metal fatigue. The jacket is of reduced dimensions at the center part of the bellows to resist bowing of the bellows and also to damp vibrations while maintaining the flexing properties of the bellows. Fatigue at the joint between the bellows and the rigid member is further reduced by a coupling in which an end fin of the bellows is maintained in rigid face-to-face contact with a surface of the rigid member throughout substantially the whole length of the fin.

One feature of this invention is the provision of a flexible electrical transmission member having a resilient elastic jacket molded thereon.

Another feature of this invention is the provision of flexible electrical transmission member having a rigid face-to-face coupling for the joint between the flexible member and a rigid member connected thereto.

Further features and advantages will be pointed out in the following specification, and in the drawings, in which:

FIG. 1 is a front plan view of the invention as embodied in a flexible waveguide;

FIG. 2 is a cross-sectional view taken along lines 2-2 of FIG. 1;

FIG. 3 is a front plan view on a reduced scale and showing the flexible member in a flexed position; and FIG. 4 is a fragmentary sectional view taken along lines 4-4 of FIG. 1.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Turning to FIG. 1, the invention is illustrated as embodied in a flexible wave guide 10 consisting of a flexible bellowslike section 11 joined to rigid end sections 12. End sections 12 are illustrated as rigid flanges for connection to other rigid wave guide members, but may alternatively be a contiguous part of another rigid waveguide member. While the drawings illustratively show a rectangular waveguide, it will be understood that the present invention is applicable to other flexible electrical transmission members, such as a coaxial connector in which the outer conductor and the coaxial inner conductor are each of cylindrical bellows configuration, as well as to other shapes of wave guides.

Bellows section 11 consists of a plurality of riblike body sections 14, see also FIG. 4, in axial alignment and joined together by a series of convolutions or integral fins 15 of hollow, riblike or channel structure. Each fin 15 has a pair of side walls 16 contiguously joined to each adjacent section 14. The ribs 15 circumferentially surround the body sections 14 and have open channel portions facing radially inward. When the bellows section 11 is not under tension, the sidewalls 16 lie in plane substantially normal to the longitudinal axis of bellow section 11.

The body and rib or fin portions of the bellows are manufactured by forming a mandrel which is shaped substantially like the bellows to be produced. The mandrel is plated with a desired thickness of metal, such as nickel, after which the mandrel is dissolved leaving only the plated material in the bellows shape. Thereafter, the bellows are again plated with a desired thickness of electrically conductive material such as gold or silver to give the desired electrical characteristics to the bellows section.

To damp vibrations in transmission member 10, a resilient elastic jacket 20 is molded to bellows section 11. Jacket 20 is deposited over the radially outer side of the bellows, and fills the outer facing channels between the side walls 16, see FIG. 4. The jacket extends slightly above the top of fins 15, so as to form a substantially flat outer surface parallel to the elongated axis of the waveguide. Jacket 20 may be formed of any resilient material having the desired damping properties, such as a silicone rubber which vulcanizes at the ambient temperature at which the wave guide is to be utilized.

The end joints where the bellows section 11 joins each of the rigid flanges 12 has improved life due to the damping action of jacket 20 and due to an improved face-to-face coupling between the flexible and rigid sections. Referring to FIG. 4, illustrating the right most coupling, which is identical to the leftmost coupling (not illustrated), the last section 14 of the flexible member has an integral single sidewall 15' which extends radially outward therefrom. Wall 15' terminates at the top of its radially outer extent. Substantially the whole radial extent of wall 15' abuts a radially extending wall 23' of a lip 23 of rigid end section 12. The radially innermost longitudinal surfaces of sections 14 form a substantially continuous plane with respect to the frequency of electrical energy being transmitted through the wave guide. This plane is aligned with the longitudinal inner surface of rigid flange 12. Typical couplings between a flexible and rigid wave guide allow movement between the last radially extending fin and a radially extending rigid wall.

In accordance with the present invention, substantially all of wall 15' is rigidly maintained against wall 23' of lip 23, for both the flexed and unflexed positions of the waveguide. The means for maintaining wall 15' rigidly against wall 23 ' may take several forms. The form illustrated consists of a bracket 25 of L-shaped cross section. Bracket 25 has a radially extending wall 27 which abuts wall 15', and a contiguous wall 28 which is transverse to wall 27 and abuts a circumferential, longitudinal extending surface of lip 23. A screw 30 extends through an aperture in wall 28 and is threaded into an internally threaded aperture in lip 23, to thereby clamp wall 15' against lip 25. Alternatively, wall 15' may be maintained against wall 23' by brazing.

To further reduce fatigue at the joint, resilient jacket 20 at each end section 30 is molded to continuously surround a number of bellow sections 14 adjacent each end wall. As seen in FIG. 4, the molded end jacket section 30 extends up to and fills the last channel in the bellow, thus bridging the bellows and a portion of the rigid waveguide, as bracket 25. At a middle or center section of the bellows, the jacket 20 necks down to strips 31 of resilient material. As seen in FIG. 2, a pair of strips 31 are located on the two opposite sides of the wave guide which are of greater dimensions. Strips 31 extend into sections of continuously increasing circumferential extent and finally join the end sections 30 which continuously surround the bellows. The center strips 31 serve to damp the bellows and also to resist bowing in the bellows when the bellows are under pressure.

We claim:

1. A vibration damped flexible electrical transmission waveguide, comprising:
   a flexible conductor of bellowslike configuration formed by a plurality of sections joined by integral fins;
   a layer of elastic material deposited on said conductor and covering a plurality of sections thereof to damp vibrations therein;
   a pair of rigid electrical transmission conductors each joined to an opposite end of said flexible conductor, said layer of elastic material extending on said flexible conductor continuously from one of said rigid transmission conductors to the other of said rigid transmission conductors, wherein said rigid conductors each have a radially extending end surface, the terminating portions of said flexible conductor each include a radially extending fin terminating at its outer radial extent, and means maintaining said fins rigidly against said end surfaces to join said flexible conductor to said pair of rigid conductors.

2. A vibration damped flexible electrical transmission member, comprising:
   a flexible conductor of bellowslike configuration formed by a plurality of sections joined by integral fins;
   a layer of elastic material deposited on said conductor and covering a plurality of sections thereof to damp vibrations, wherein said elastic layer completely encircles a plurality of sections adjacent each end of said flexible conductor, and said elastic layer further includes elastic material on the middle portion of said flexible conductor in at least one strip of material extending over less than the circumference of the middle portion of said flexible conductor.

3. The transmission member of claim 2 wherein said flexible conductor has a rectangular cross section defined by two walls of greater extent than two walls transverse thereto, and the elastic material deposited on the middle portion of said flexible conductor extends longitudinally in strips along said two walls of greater extent.

4. In a flexible electrical transmission waveguide of bellowslike configuration formed by a plurality of sections joined by integral fins, said fins each having a pair of side walls contiguously joined to each adjacent section and a rigid electrical transmission member joined to said flexible member, the improvement comprising:
   an end portion for said flexible member consisting of a single side wall extending radially and terminating at the top of its radial extent,
   a radially extending end surface for said rigid member adjacent said single sidewall; and
   means maintaining said single sidewall rigidly against said end surface throughout substantially the whole radial extent of said sidewall to prevent movement between the last radially extending fin and the radially extending rigid end surface so that a substantially continuous plane with respect to the frequency of electrical energy being transmitted through the waveguide is formed.

5. The transmission waveguide of claim 4 wherein said maintaining means includes a bracket having a radially extending wall located adjacent said single sidewall and a wall transverse to said radially extending wall and located adjacent an axially extending surface of said rigid member, and means fixedly attaching said transverse wall to said axially extending wall in order to clamp said flexible member to said rigid member.

6. The transmission waveguide of claim 4 wherein said flexible member includes a layer of elastic material deposited on said flexible member and covering a plurality of sections to damp vibrations in said flexible member.

UNITED STATES PATENT OFFICE
CERTIFICATE OF CORRECTION

Patent No. 3,593,751            Dated July 20, 1971

Inventor(s) Donald L. Herling et al.

It is certified that error appears in the above-identified patent and that said Letters Patent are hereby corrected as shown below:

On the cover sheet insert -- [73] Assignee The Hallicrafters Co. --.

Signed and sealed this 15th day of February 1972.

(SEAL)
Attest:

EDWARD M. FLETCHER, JR.
Attesting Officer

ROBERT GOTTSCHALK
Commissioner of Patents